United States Patent Office 3,682,867
Patented Aug. 8, 1972

3,682,867
POLYUREA POLYMER PREPARATION FROM ORGANIC POLYISOCYANATES AND COMPLEX DERIVATIVES OF POLYAMINES WHEREIN THE PRIMARY AMINE GROUPS THEREOF ARE CONVERTED TO ALDIMINE OR KETIMINE GROUPS AND THE SECONDARY AMINE GROUP OR GROUPS THEREOF HAVE BEEN REACTED WITH ORGANIC ISOCYANATES
William E. Shackelford, 1130 Croswell St., and Warren J. Fullen, Rte. 2, both of Kankakee, Ill. 60901
No Drawing. Application Mar. 18, 1968, Ser. No. 714,009, which is a continuation-in-part of application Ser. No. 488,251, Sept. 17, 1965. Divided and this aplication May 6, 1970, Ser. No. 47,928
Int. Cl. C08g 22/02
U.S. Cl. 260—77.5 CH                                    12 Claims

ABSTRACT OF THE DISCLOSURE

Polyamines having the primary amine groups thereof converted to aldimine or ketimine groups and at least one secondary amine group are reacted with equivalent amounts of organic isocyanates to yield new compounds or derivatives, the equivalents being based on the secondary amine and isocyanate groups. The resulting products are reacted with organic polyisocyanates to yield polymers especially useful as coatings.

---

This application is a division of Ser. No. 714,009, filed Mar. 18, 1968 which in turn is a continuation in part of our earlier filed application Ser. No. 488,251, filed Sept. 17, 1965 and now abandoned.

The present invention relates to derivatives of certain polyamine compounds and organic isocyanates. More particularly, it relates to derivatives of organic isocyanates and certain polyamine compounds in which the primary amine groups are blocked by conversion to aldimine or ketimine groups. It also relates to the preparation of polymers from such derivatives and organic polyisocyanates.

It has previously been proposed to prepare polyureas from compositions comprising polyisocyanates and polyamines wherein the primary amine groups are blocked by ketimine or aldimine groups. Such compositions were found to have reasonable stability in the absence of moisture. Finally cured or formed polyurea products are prepared therefrom by exposure to moisture which converts the blocked polyamine compound to the free polyamine which is then capable of reacting with the polyisocyanate to form the polyurea polymer. Such compositions find use as coatings, in the preparation of castings, and as caulking compounds, sealants and adhesives.

The procedure previously proposed has been to react the blocked polyamine with an amount of polyisocyanate sufficient to yield a polyurea polymer. While such reactants of reasonably high purity can be admixed a considerable length of time prior to use in the complete absence of moisture, a more preferred method is to admix the reactants shortly before use thereof in the environment present at the point of use. Such environment may contain some or a considerable amount of moisture. Where the reactants are admixed in the presence of enough moisture to cause a portion of the blocked polyamine to revert to the free polyamine, it was found in some cases that gel particles formed in the composition before the two reactants were properly mixed. It is believed that the said gel particles are caused by the rapid reaction of the freed primary amine groups of the polyamine with the polyisocyanate under the incomplete mixing conditions. Such compositions containing said gel particles tend to yield coatings and the like which are not as homogeneous and smooth as desired. In addition, it was found that the exotherm of the reaction was sometimes undesirably high even when the reactants were admixed in the presence of a solvent. In this regard, it was found that with some blocked polyamines and polyisocyanates, the exotherm was so undesirably high that coatings and the like could not be prepared from such reactants under any practical conditions.

In addition to the above disadvantages of the noted prior procedures, some of the blocked polyamines retain in large measure the toxicity characteristics of the polyamine per se. Also, since the polyisocyanate is often of higher molecular weight than the blocked polyamine, uneven amounts of materials must be measured for the reaction. And many of the blocked polyamines cannot have large amounts of pigments satisfactorily incorporated therein in the absence of considerable amounts of solvent. Since many of the pigments contain moisture or otherwise catalyze the self polymerization of the polyisocyanate, they cannot be incorporated in the latter component.

It is therefore an object of the present invention to provide novel derivatives of organic isocyanates and certain polyamine compounds. Another object of the invention is to provide such derivatives of organic isocyanates and certain polyamine compounds in which the primary amine groups are blocked by ketimine or aldimine groups. A further object of our invention is to provide a novel method for the preparation of polyureas from such derivatives wherein the said derivatives are reacted with polyisocyanates. These and other objects will become apparent from the following detailed description of the invention.

We have now discovered novel derivatives of polyamine compounds having primary amine groups blocked by ketimine or aldimine groups and at least one secondary amine group, said derivatives being prepared by reacting the said polyamines with a sufficient amount of an organic isocyanate to react with the secondary amine group or groups of said polyamine. Such derivatives are particularly useful for reaction with polyisocyanates to provide polyurea polymers of high utility and the present invention is also concerned with such preparation. We have found that the novel derivatives of our invention which are of reasonably high purity can be easily and readily mixed with polyisocyanates and that the resulting compositions have good stability in the absence of moisture. We have also found that our derivatives can be admixed with the polyisocyanates in environments which contain considerable amounts of moisture. When the latter procedure is followed, their is substantial elimination of the problem of gel particle formation which often attends the mixing of polyisocyanates with ketimine or aldimine blocked polyamines having free secondary amine groups. In addition, our derivatives are quite stable and free from precipitate formation even when exposed to environments containing substantial amounts of moisture for from one to several hours.

Our new derivatives have low toxicity. And when reacted with a polyisocyanate, they give a lower exotherm of reaction than the corresponding ketimine or aldimine containing a free secondary amine group or groups. This lower exotherm is important where reasonably large quantities of reactants are concerned, and even with reasonably small quantities of reactants, the reduced exotherm allows the production of useful coatings and the like where the same cannot be produced using the corresponding free secondary amine group containing ketimine or aldimine. Further, our derivatives have increased molecular weight and thus in many cases allow for the use of more even qualities of reactants. Also, because of the increased molecular weight and corresponding viscosity, they can be satisfactorily pigmented with relatively large quantities of pigment. It is additionally possible to provide polyurea polymers with controlled positions for different isocyanate moieties. Thus one polyisocyanate can be used in the preparation of the derivative and a second for the preparation of polymers therefrom. This allows for the tailoring of the properties of the resulting polymers and the production of polymers having properties not attainable through the reaction of the corresponding blocked polyamine having free secondary amine groups and a mixture of the same polyisocyanates.

Any polyamine capable of reacting with an organic isocyanate and having at least one secondary amine group may be used in the preparation of the derivatives of the present invention. The preferred polyamines are the alkylene polyamines and the substituted alkylene polyamines. The preferred polyamines are selected from those having the following formula:

$$H_2N(RNH)_nRNH_2$$

where R is a difunctional aliphatic group containing from 2 to about 48 carbon atoms and $n$ is an integer of 1 to about 20. R may represent the same or different radicals in any one polyamine compound. Where the polyamines contain two or more secondary amine groups, one or more of said groups may have the hydrogen replaced by an aliphatic group, such as an aliphatic hydrocarbon group of 1 to about 24 carbon atoms—i.e. methyl, propyl, butyl, decyl, hexadecyl, hexenyl, octenyl, tridecenyl, octadecyl, undecynyl and the like. Inert or non-interfering groups such as Cl, nitro and the like may be present on the group R or the described substituent replacing the hydrogen of one or more secondary amine groups. The polyamines must contain at least one free secondary amine group,

prior to the preparation of the derivatives of our invention.

Especially preferred polyamines are those having the formula as set forth above wherein R is an aliphatic hydrocarbon group and $n$ is 1 to 3. It is still more preferred that R is an alkylene group of 2–6 carbon atoms.

Typical of the amines which may be used are diethylene triamine, triethylene tetramine, etc., and the corresponding propylene, butylene, etc. amine.

The primary amine groups in the polyamine compounds are converted to aldimines or ketimines by reaction with a carbonyl compound. Such carbonyl compound may have the following theoretical structural formula:

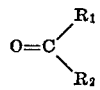

wherein $R_1$ and $R_2$ are organic radicals or hydrogen and are each substantially inert to the ketimine or aldimine formation reaction. At least one of the $R_1$ and $R_2$ groups must be an organic radical which is preferably a short chain alkyl group (1 to 4 carbon atoms). Preferred compounds are low molecular weight ($C_2$–$C_6$) aldehydes or ketones that are volatile so that an unreacted excess thereof may easily be removed by conventional distillation practices when the reaction is completed. Such volatile compounds are also preferred so that when the derivatives of our invention are mixed with polyisocyanates and exposed to moisture, the freed aldehyde or ketone can be easily removed from the reaction mixture. It is often preferred to use a carbonyl compound which boils below or near the boiling point of water or which readily distills with water. The reaction of the carbonyl compounds with the primary amine groups can be illustrated as follows:

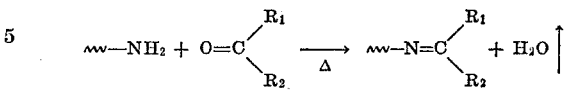

Preferred examples of the carbonyl compounds include such aldehydes and ketones as acetone, methylethyl ketone, diethyl ketone, methylpropyl ketone, methylisopropyl ketone, methylisobutyl ketone, methyl-n-butyl ketone, methyl-tert-butyl ketone, ethylisopropyl ketone, acetaldehyde, propionaldehyde, butyraldehyde, isobutyraldehyde, and the like (i.e. including hexanone and hexanal). Especially preferred carbonyl compounds are acetone, methylethyl ketone and methylisobutyl ketone, i.e.

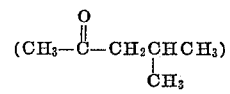

The derivatives of the present invention are prepared from the polyamine compounds having at least one free secondary amine group and having the primary amine groups thereof blocked with ketimine or aldimine groups (i.e. —N=C<) by reacting same with an organic isocyanate. Preferred isocyanates are the aliphatic, cycloaliphatic and araliphatic isocyanates.

Typical polyisocyanates which may be used in preparing the derivatives of the present invention include the polymethylene diisocyanates such as ethylenediisocyanate, trimethylenediisocyanate, tetramethylenediisocyanate, pentamethylenediisocyanate, hexamethylenediisocyanate, etc.; other alkylene diisocyanates, such as propylene-1,2-diisocyanate, butylene-1,2-diisocyanate, butylene-1,3-diisocyanate, butylene-2,3-diisocyanate, etc.; alkylidene diisocyanates, such as ethylidene diisocyanate, butylidene diisocyanate, etc.; cycloalkylene diisocyanates, such as cyclopentylene-1,3-diisocyanate, cyclohexylene - 1,4-diisocyanate, 4,4′-diisocyanate bis(cyclohexyl)methane, etc.; cycloalkylidene diisocyanates, such as cyclopentylidene diisocyanate, cyclohexylidene diisocyanate, etc.; triisocyanates such as 1,2,4-butanetriisocyanate, 1,3,3-pentanetriisocyanate 1,2,2-butanetriisocyanate, etc.

Examples of araliphatic polyisocyanates which may be used in the present invention include the following:

p-phenylene-2,2′-bis(ethyl isocyanate),
p-phenylene-3,3′-bis(propyl isocyanate),
p-phenylene-4,4′-bis(butyl isocyanate),
m-phenylene-2,2′-bis(ethyl isocyanate),
1,4-naphthalene-2,2′-bis(ethyl isocyanate),
4,4′-diphenylene-2,2′-bis(ethyl isocyanate),
4,4′-diphenylene ether-2,2′-bis(ethyl isocyanate),
tris(2,2′,2″-ethyl isocyanate benzene),
5-chloro phenylene-1,3-bis(propyl-3-isocyanate),
5-methoxy phenylene-1,3-bis(propyl-3-isocyanate),
5-cyano phenylene-1,3-bis(propyl-3-isocyanate) and
5-methyl phenylene-1,3-bis(propyl-3-isocyanate).

Typical aromatic polyisocyanates which may be used include tolylene diisocyanate, m-phenylene diisocyanate, p-phenylene diisocyanate, 1-methyl-2,4-phenylene diisocyanate, naphthylene-1,4-diisocyanate, diphenylene-4,4′-diisocyanate, etc.; aliphatic-aromatic diisocyanates such as xylylene-1,4-diisocyanate, xylylene - 1,3-diisocyanate, 4,4′-diphenylenemethane diisocyanate, etc.

A particularly desirable group of polyisocyanates to be employed in the present invention are those described in the application of Rogier and Kamal, Serial No. 250,211, filed January 9, 1963, entitled "Polyisocyanates and Derivatives." These polyisocyanates are derived from polymeric fat acids and have the following idealized structural formula:

[R'] —[(CH$_2$)$_y$NCO]$_x$ where $y$ is 0 or 1, $x$ is an integer of 2 to about 4 and R' is the hydrocarbon group of polymeric fat acids. Preferably, $x$ is 2. The polyisocyanates of the above formula wherein $y$ is 0 are prepared by converting the polymeric fat acids to the corresponding polymeric acid chlorides, reacting the acid chlorides with a metal azide to form the polymeric acyl azides and then heating the acyl azides to produce the polyisocyanates. This method of preparation can be conveniently illustrated by the following equations (using a dimeric fat acid as an example):

$$3D(COOH)_2 + 2PCl_3 \longrightarrow 3D(COCl)_2 + 2H_3PO_3$$
$$D(COCl)_2 + 2NaN_3 \longrightarrow D(CON_3)_2 + 2NaCl$$
$$D(CON_3)_2 \xrightarrow{\Delta} D(NCO)_2 + 2NaCl$$

The polyisocyanates wherein $y$ is 1 are prepared by converting the polymeric fat acids to the corresponding polynitriles and then hydrogenating the polynitriles in the presence of ammonia and a catalyst such as Raney nickel to form polyamines. The polyamines are then reacted with phosgene to give the polyisocyanates. This method of preparation can be conveniently illustrated by the following equations (using a dimeric fat acid as an example):

$$D(COOH)_2 + 2NH_3 \longrightarrow D(CN)_2 + 4H_2O$$
$$D(CN)_2 + 4H_2 \xrightarrow[\text{Catalyst}]{NH_3} D(CH_2NH_2)_2$$
$$D(CH_2NH_2)_2 + COCl_2 \longrightarrow D(CH_2NCO)_2 + 2HCl$$

The polymeric fat acids, useful as the starting materials for preparing the above polyisocyanates, are prepared by polymerizing a fat acid. The term "fat acid" as used herein refers to naturally occurring and synthetic monobasic aliphatic acids having hydrocarbon chains of 8–24 carbon atoms. The term "fat acids," therefore, include saturated, ethylenically unsaturated and acetylenically unsaturated acids. "Polymeric fat radical" is generic to the divalent, trivalent and polyvalent hydrocarbon radicals of dimerized fat acids, trimerized fat acids and higher polymers of fat acids, respectively. These divalent and trivalent radicals are referred to herein as "dimeric fat radical" and "trimeric fat radical."

The polyisocyanate derived from these dimeric fat radicals and trimeric fat radicals may be referred to hereinafter by the names dimeryl isocyanate and trimeryl isocyanate. These materials may be produced from mixtures of dimer and trimer fat acid and the relative quantities may be controlled by the degree to which the individual compounds have been isolated in preparing the dimer and trimer fat acids.

The polyisocyanates which may be used in the present invention may be used in the form of the free isocyanate or they may be used in the form of so-called prepolymers. These prepolymers are reaction products of polyols or polyester polyols with the polyisocyanates such that essentially 1 mol of polyisocyanate is reacted with each equivalent of hydroxyl group, the product thus being an isocyanate terminated prepolymer. It is to be thus understood that the term "polyisocyanate" is intended to include the isocyanate terminated prepolymers of simple polyols, polyether polyols, and polyester polyols. Typical polyols include trimethylopropane, 1,4,6-hexanetriol, glycerol, ethylene glycol, diethylene glycol, 1,4-butanediol, 1,4-butenediol, 1,3-butanediol and the like. The polyether polyols are hydroxy terminated homopolymers and copolymers of ethylene oxide, propylene oxide, butylene oxide, and the like. The polyester polyols are hydroxyl terminated polymers which may be derived from the above polyols and any of the typical polybasic acids used for the preparation of polyesters may be used.

Mono-isocyanates may also be employed in preparing the derivatives of the present invention. Such isocyanates may be aliphatic, cycloaliphatic, aromatic, araliphatic and the like. Representative of such isocyanates are the following: decylisocyanate, hexadecylisocyanate, heptadecylisocyanate, heneicosylisocyanate, octadecylisocyanate, docosylisocyanate, 18-pentatricontane isocyanate, naththenic isocyanate derived from bicyclic napththenic acid—i.e. $C_{20}H_{37}COOH$, 1-stearyl-oxyphenylene - 4 - isocyanate, 4-carbooctadecoxy tetrahydrophenyl isocyanate, n-dodecyl isocyanate, 9-octadecenyl isocyanate, cetyl isocyanate, cholesterol adipic acid ester isocyanate, octadecyl oxy acetic acid isocyanate, dodecyl mercaptan acetic acid isocyanate, stearyl glycolic isocyanate, stearyl amino acetic acid isocyanate, urethane N-acetic acid isocyanate, hexadecyl oxy-phenyl isocyanate, octadecyl mercapto-propiono isocyanate, octadecyl mercapto-acetic acid isocyanate, lenulinic dioctadecyl mercaptol isocyanate, and the like. paring the derivatives of the present invention are the Preferred organic isocyanates to be employed in preparing the derivatives of the present invention are the isocyanates having hydrocarbon radicals. Between the mono and poly-isocyanates, it is preferred to employ the latter. Particularly preferred compounds are the diisocyanates. Of this class the dimeryl diisocyanates are preferred reactants. Mixtures of the various organic isocyanates may be employed.

The derivatives of our invention are prepared by simply mixing the ketimine or aldimine blocked polyamine with the organic isocyanate. Such mixing is preferably carried out in a reaction environment substantially free of moisture. Where desired, the reaction mixture may be heated although the reaction is normally exothermic to a certain extent. The organic isocyanate is used in an amount about equivalent to the equivalents of free secondary amine groups of the polyamine. In this respect, if the polyamine contains one free secondary amine group and the isocyanate is a monoisocyanate, one mole of the polyamine is reacted with one mole of the isocyanate. If the polyamine contains two free secondary amine groups and the isocyanate is a monoisocyanate, one mole of the polyamine would be reacted with two moles of the isocyanate. If the polyamine has one free secondary amine group and the isocyanate is a diisocyanate, two moles of the polyamine would be reacted with one mole of the diisocyanate. It is thus apparent that the ratio of reactants varies as to the number of free secondary amine groups of the polyamine—i.e. one, two, three or more—and as to whether the isocyanate is mono, di, tri or higher. The derivative may be prepared in the presence of a solvent or diluent if desired. The reaction of the secondary amine group or groups (i.e. >NH) of the polyamine with the isocyanato group (i.e. —NCO) yields a linkage of the following structure:

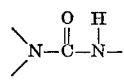

The derivatives of the present invention are complex materials. In this respect they comprise a residue of a polyamine, 2 or more (preferably less than about 50) ketimine or aldimine blocked primary amine groups and 1 or more (preferably less than about 50) urea groups derived from the secondary amine group or groups of the polyamine and the isocyanate compounds. In some of the preferred and simpler aspects, the derivatives can be defined structurally. Thus when the polyamine has only one free secondary amine group and the isocyanate is mono- or di-functional or when the polyamine has more than one free secondary amine group and the isocyanate is mono-functional, the derivatives can be defined by the following idealized, structural formulae:

I.
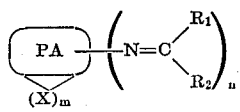

and

II.

where $R_1$ and $R_2$ are as defined above, $n$ is an integer of at least 2, $m$ is an integer of at least 1,

is the residue of a polyamine exclusive of the ketimine blocked primary amine groups and the urea linked secondary amine nitrogen or nitrogens, $>X$ is

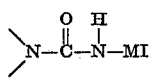

where MI is the residue of a monoisocyanate exclusive of the isocyanato group, and

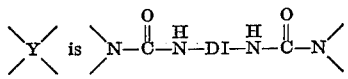

where DI is the residue of a diisocyanate exclusive of the isocyanato groups. Where the polyamine contains two or more secondary amine groups and the isocyanate is di, tri or higher functional, complex mixtures of derivatives tend to be produced. Such mixtures include compounds where two or more polyamine moieties are linked by two or more isocyanate moieties. The derivatives of the present invention also include those prepared using two or more blocked polyamines and/or two or more different isocyanates.

The following examples serve to illustrate the preparation of the derivatives of the present invention as well as the process of preparing polymers from such derivatives. The examples are not to be considered as limitations of the invention.

EXAMPLE A

Forty seven parts by weight of the diketimine made from diethylene triamine and methylisobutyl ketone were mixed in an atmosphere substantially free of moisture with 53 parts by weight of dimeryl isocyanate (molar ratio of 2:1). The dimeryl isocyanate had the theoretical structural formula $$D(CH_2NCO)_2$$

where D is the dimeric fat acid radical and in this case was derived from the mixture of dimerized fat acids obtained from the fat acids in tall oil consisting mainly of a mixture of dimerized linoleic and oleic acids. The resulting derivative appeared to be stable and free from precipitate formation when exposed to air at 75° F. and 50% relative humidity for several hours. It had the following idealized structural formula:

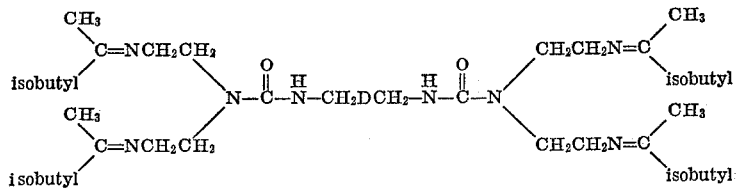

EXAMPLE B

Example A was repeated except that 188 parts by weight of the diketimine made from diethylene triamine and methylisobutyl ketone were blended with 172 parts by weight of methylisobutyl ketone and then reacted with 212 parts by weight of the dimeryl isocyanate. The reaction flask was placed in an ice bath and the dimeryl isocyanate was added slowly with stirring to limit the temperature to 26° C. maximum. The derivative had the same structure as the derivative of Example A.

EXAMPLE C

Example A was essentially repeated using 128.4 parts by weight of the diketimine and 154.4 parts by weight of dimeryl isocyanate. In this case the divalent hydrocarbon radical of the diisocyanate was saturated by hydrogenation of the dimerized fat acids prior to their conversion into the diisocyanate. The reaction was conducted under an atmosphere of nitrogen with the reaction mixture being cooled by a bath of circulating tap water. The derivative had the same general structure as that of Example A with D being a saturated divalent hydrocarbon radical.

EXAMPLE D

Example C was essentially repeated using 77 parts of the diketimine of diethylene triamine and methylisobutyl ketone and 26.1 parts toluene diisocyanate (Nacconate 80) (molar ratio 2:1). The diketimine was dissolved in 77 parts by weight of a 1.1 by weight mixture of xylene and Cellosolve acetate was charged to the reaction flask and then the toluene diisocyanate dissolved in 34.0 parts by weight of the above solvent was added through a dropping funnel over a period of about 4 minutes. The reaction was carried out under a blanket of nitrogen and with the use of a cooling bath of circulating cold tap water. The resulting product was a 48.2% by weight solution of the derivative in the solvent, said derivative having the following formula:

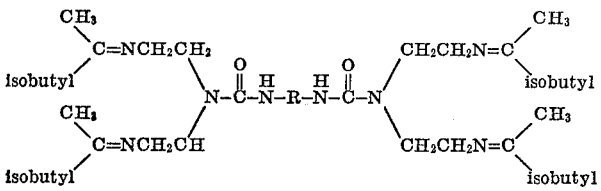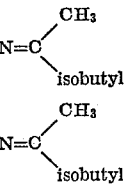

where R is the divalent hydrocarbon radical of the toluene diisocyanate.

As indicated above, the derivatives of the present invention are particularly useful for preparing polymers by reaction with organic polyisocyanates and such process also forms a part of our invention. The polyisocyanates to be reacted with derivatives are those described hereinabove with regard to the preparation of the derivatives. It is particularly preferred to react the derivatives with polyisocyanates containing hydrocarbon radicals and especially diisocyanates of this type. Preferred diisocyanates are those derived from dimeric fat acids. While aromatic polyisocyanates can be employed in our process, it is preferred to use same in combination with aliphatic polyisocyanates, cycloaliphatic polyisocyanates or araliphatic polyisocyanates. Of course, mixtures of the various other polyisocyanates can also be employed.

The ratio of the derivative to the polyisocyanate can vary over relatively wide limits. However, it is preferred that about equivalent amounts of the derivative based on the blocked primary amine groups and the polyisocyanate are used. In this respect, a derivative having two blocked primary amine groups and derived from a monoisocyanate would be reacted in substantially equimolar ratios with diisocyanates to form substantially linear polyurea polymers. Where the derivative contains four blocked primary amine groups (i.e. derived from a polyamine having two blocked primary amine groups and one free secondary amine group and a diisocyanate in a molar ratio of polyamine to diisocyanate of about 2:1), one mole of same would be reacted with about two moles of a diisocyanate to produce a fairly high cross-linked polyurea polymer. It is clear that a wide variety of polymers can be prepared according to our process depending on the functionality of the derivative as determined by the number of blocked primary amine groups and the functionality of the polyisocyanate as determined by the number of NCO groups. The polymers are prepared by simply admixing the derivatives with the organic polyisocyanates and exposing the reaction mixture to water—i.e. moisture from the atmosphere. The reaction can be carried out in the presence of a diluent or solvent and, if desirable, the reaction mixture can be heated or cooled to control the rate of reaction. When coatings, films or the like are to be prepared from the compositions, it may be desirable to include fillers or pigments and the like. Representative of such materials are amorphous silicas, titanium dioxide, carbon black, chrome yellow, phthalocyanine blue and green, toluidine red, quinacridone red, green gold, toluidine yellow, iron oxide red and fire orange red.

EXAMPLE E

Forty-eight and one-half parts by weight of the derivative of Example A were mixed with 51.5 parts by weight of the dimeryl isocyanate as used in Example A (ratio of one mole derivative to two moles of the dimeryl isocyanate). Films of the reaction mixture when applied to tin, steel, wood and glass substrates with film thicknesses varying from 1.5 mil to 5 mils and exposed to a temperature of about 75° C. and a relative humidity of about 50%, yielded coatings having good hardness, excellent flexibility and good solvent resistance. No gel particles were formed prior to complete mixing even though the derivative and isocyanate were admixed in an atmosphere containing about 50% relative humidity. The exotherm of the reaction was approximately 23° C.

EXAMPLE F

A portion of the derivative of Example A was dissolved at a concentration of 50% by weight in mineral spirits. Nine parts by weight of this solution was mixed with one part of Santocel 54, a silica aerogel. Nine hundred grams of this mixture was milled overnight in a one quart capacity laboratory pebble mill to yield a Hegman grind fineness of 5. Twenty grams of the resulting dispersion was mixed with nine grams of the derivative of Example A, 19 grams of the dimeryl isocyanate as used in Example A and 11 grams of mineral spirits (approximate molar ratio of one mole of derivative A to two moles of the dimeryl isocyanate). This composition when brushed on polished black glass, air dired one hour and baked for thirty minutes at 220° F. yielded a coating having a Gardner 60° gloss of 32%. A smooth satin finish was produced when this material was brush applied to wood.

EXAMPLE G

Example F was repeated except that the amount of Santocel 54 was reduced to a level of 75% of the amount employed in Example D. The resulting coating had a Gardner 60° gloss of 36%. When such composition was applied to wood, a smooth satin finish resulted.

EXAMPLE H

Portions of the derivative of Example A were dissolved at a concentration of 50% by weight in toluene and in mineral spirits. Both solutions were mixed with an equal weight of titanium dioxide and 600 gram quantities of such mixtures were milled overnight to give a Hegman grind fineness of 7. One hundred grams of each of the resulting dispersions were then mixed with 26.6 grams of dimeryl isocyanate as used in Example A (molar ratio of about one to two of the derivative to the dimeryl isocyanate) and three grams of solvent (same as used to make the dispersion—i.e. toluene or mineral spirits). Both of these coating compositions were brush applied to wood and cold rolled steel and the coatings allowed to air dry at approximately 50% relative humidity and 75° F. for about 16 hours. The coatings obtained from the composition which utilized mineral spirits had a Gardner 60° gloss of 80% on both the wood and steel. The coatings obtained from the compositions which utilized toluene as the solvent had a Gardner 60° gloss at 92%. The coatings were calculated to contain about 20.4% of the titanium dioxide by volume.

EXAMPLE I

Fifty eight parts of the derivative of Example B in the methyl isobutyl ketone solvent were mixed with 42 parts by weight of the dimeryl isocyanate as used in Example A. The mixing was carried out in the same environment as in Example E and the exotherm of the reaction was approximately 15° C. Again no gel particles formed and films, applied as in Example E, yielded coatings having the same excellent properties as those of Example E.

EXAMPLE J

A portion (56.6 grams—0.2 equiv.) of the derivative of Example C was dissolved in 50.7 grams of a 1:1 by weight mixture of xylene and Cellosolve acetate. To this solution was added 61.8 grams (0.2 equiv.) of the dimeryl isocyanate as used in Example C. The maximum temperature on mixing was 34.° C. In contrast, the mixing of the diketimine of diethylene triamine and methylisobutyl ketone (25.7 grams—0.3 equiv.) in 50.7 grams of the above solvent and the dimeryl isocyanate (92.7 grams—0.3 equiv.) gave a maximum temperature of 54° C. Thus the exotherm from ambient room temperature (approximately 25° C.) was over three times as much for the latter procedure as compared to the use of the derivative of the present invention. Unpigmented coatings prepared from the above mixture at 72°±2° F. and 50%±5% relative humidity had comparable properties (3 mil films on glass, bonderized steel, polished cold rolled steel, black plate and bonderized aluminum). Thus the coatings had extensibilities of greater than 60% (General Electric Test), reverse impacts of greater than 160 in. lbs. and approximately equivalent solvent resistance and dry adhesion to the various substrates. The coatings prepared from the derivative were somewhat softer but had better adhesion to black plate than the coating prepared from the diketimine. The derivative prepared as in Example C has also been found to be non-sensitizing (Skin Sensitization Test—Guinea Pigs) and to have $LD_{50}$ Ratings (g./kg.) as follows: Acute Oral Toxicity (Albino Rats)— 17.0±3.2; Acute Dermal Toxicity (Albino Rabbits)— 15.4.

EXAMPLE K

Example J was repeated except that 126.4 grams $TiO_2$ were milled into the respective derivative and diketimine solutions prior to the mixing of same with the dimeryl isocyanate. The milling was accomplished in a paint shaker using an 8 oz. bottle and 50 cc. of glass beads for one hour. The diketimine did not make a good pigment grind whereas the derivative did yield a good pigment grind. The exotherm on mixing was about twice as high for the diketimine as for the derivative. The coatings had similar properties except that those prepared from the diketimine mixture were not as homogeneous due to poor pigment grind achieved. The pigment grind of the latter mixture could be improved but at the expense of the use of additional solvent which would have to be removed to obtain the same pigment solids content of the coating mixture.

EXAMPLE L

A portion of the solution of the derivative of Example D (71.2 grams—48.2% by weight solids—0.2 equiv.) was diluted with 14.7 grams of the solvent as used in the preparation of such derivative. To this solution was added 17.4 grams (0.2 equiv.) of toluene diisocyanate (Nacconate 80). The maximum temperature on mixing was 64° C. In contrast, the mixing of the diketimine of diethylene triamine and methylisobutyl ketone (25.7 grams—0.3 equiv.) in 51.8 grams of the solvent mixture and the toluene diisocyanate (26.1 grams—0.3 equiv.) gave a maximum temperature of 150° C. Thus the exotherm from ambient room temperature (approximately 25° C.) was over four times as much for the latter procedure as compared to the use of the derivative of the present invention. Furthermore, the gel time of the diketimine-toluene diisocyanate mixture was so short (25 sec.) that coatings could not be made from the same. Coatings could be prepared from the derivative-toluene diisocyanate mixture since the pot life or gel time of the mixture was 5 minutes. Such coatings (cured as in Example J) were brittle although they had reasonable solvent resistance when applied on bonderized steel. Pigmented coatings could not be made from the diketimine (25.7 grams—0.3 equiv.), toluene diisocyanate (26.1 grams—0.3 equiv.), solvent mixture (37.0 grams) and $TiO_2$ (49.4 grams) because of the short gel time (20 sec.) of the composition. In contrast, coatings could be prepared from the derivative solution (71.2 grams—48.2% solids—0.2 equiv.), toluene diisocyanate (17.4 grams—0.2 equiv.) and $TiO_2$ (49.4 grams). Such latter composition had a gel time of 5 minutes and yielded coatings (on bonderized steel) which again were brittle but had reasonable solvent resistance (24 hour immersion in water, toluene, aviation gasoline, Skydrol 500, 5% acetic acid, 50% ethanol and mineral spirits).

EXAMPLE M

Example J was repeated except that the dimeryl isocyanate was replaced by 17.4 grams (0.2 equiv.) of toluene diisocyanate (Nacconate 80) and the derivative of Example C was dissolved in 74.0 grams of the solvent. A maximum temperature of 57° C. was realized on mixing. In contrast, a maximum mixing temperature of 67° C. was obtained when 25.7 grams (0.3 equiv.) of the diketimine of diethylene triamine and methylisobutyl ketone dissolved in 74.0 grams of the solvent were mixed with 30.9 grams (0.1 equiv.) of the dimeryl isocyanate and 17.4 grams of the toluene diisocyante. The coating prepared from the derivative was much more impact resistant. Reverse impact of 140–160 in.-lb. as compared to less than 5 in.-lb. for the coating derived from the diketimine-dimeryl isocyanate-toluene diisocyanate mixture. Other coating characteristics were comparable.

While the above description has been set forth with particular reference to the specific examples, it is to be understood that the invention is not restricted thereto but may be varied within the scope of the appended claims.

Now, therefore, we claim:

1. The process of preparing a polyurea polymer which comprises mixing a polyamine derivative with an organic polyisocyanate and adding moisture to the resulting mixture, said polyamine derivative having the formula

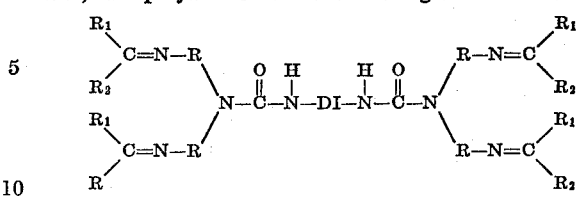

where R is an aliphatic hydrocarbon group of from 2 to about 48 carbon atoms which may contain inert groups, $R_1$ and $R_2$ are hydrogen or alkyl groups of 1 to 6 carbon atoms with the proviso that one of said $R_1$ and $R_2$ must be an alkyl group and DI is the divalent radical of an organic diisocyanate exclusive of the isocyanato groups and said polyamine derivative and polyisocyanate being used in about equivalent amounts, the equivalents being based on the

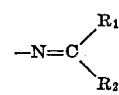

groups of the polyamine derivative and the isocyanato groups of the polyisocyanate.

2. The process of claim 1 wherein DI is a divalent hydrocarbon radical.

3. The process of claim 1 wherein DI is a divalent aromatic hydrocarbon radical.

4. The process of claim 1 wherein DI is the divalent hydrocarbon radical of a dimerized fat acid, said dimerized fat acid having been prepared by polymerizing monobasic aliphatic carboxylic acids of 8 to 24 carbon atoms.

5. The process of claim 1 wherein R is an alkylene hydrocarbon radical of 2 to about 6 carbon atoms.

6. The process of claim 1 wherein $R_1$ and $R_2$ are hydrogen or alkyl groups of 1 to 4 carbon atoms with the proviso that one of said $R_1$ and $R_2$ must be an alkyl group.

7. The process of claim 1 where R is an alkylene hydrocarbon group of 2 to about 6 carbon atoms, $R_1$ and $R_2$ are hydrogen or alkyl groups of 1 to 4 carbon atoms with the proviso that one of said $R_1$ and $R_2$ must be an alkyl group and DI is a divalent hydrocarbon radical.

8. The process of claim 7 where R is ethylene, $R_1$ is methyl and $R_2$ is isobutyl.

9. The process of claim 8 where DI is the divalent hydrocarbon radical of a dimerized fat acid, said dimerized fat acid having been prepared by polymerizing monobasic aliphatic carboxylic acids of 8 to 24 carbon atoms.

10. The process of claim 1 where the polyamine derivative has the formula

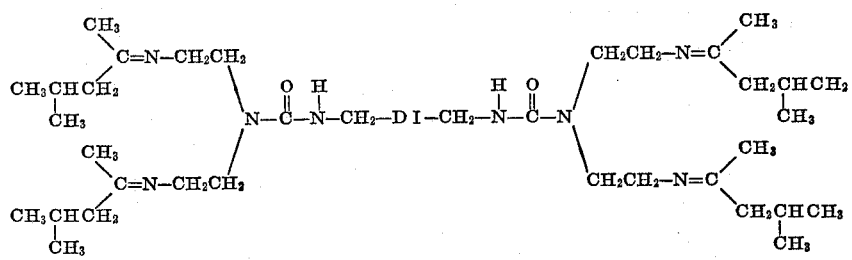

where DI is the divalent hydrocarbon radical of a mixture of dimerized linoleic and oleic acids.

11. The process of claim 10 wherein the organic polyisocyanate is a diisocyanate of the formula

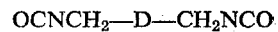

where D is the divalent hydrocarbon radical of a mixture of dimerized linoleic and oleic acids.

12. The process of claim 1 wherein the polyamine derivative has the formula
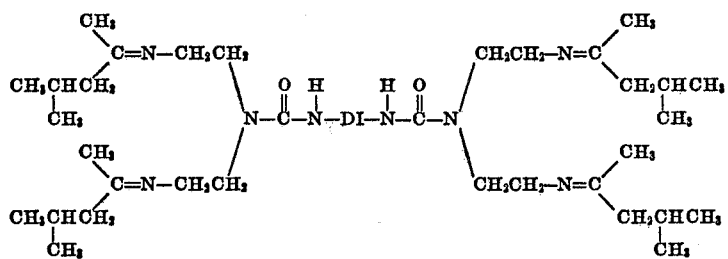
where DI is the divalent hydrocarbon group of toluene diisocyanate.
References Cited
UNITED STATES PATENTS
3,420,800  1/1969  Haggis _____ 260—75
3,455,883  7/1969  Kamal et al. _____ 260—77.5
DONALD E. CZAJA, Primary Examiner
M. J. WELSH, Assistant Examiner
U.S. Cl. X.R.
260—553 R, 553 A

PO-1050
(5/69)

UNITED STATES PATENT OFFICE
CERTIFICATE OF CORRECTION

Patent No. 3,682,867                    Dated August 8, 1972

Inventor(s) William E. Shackelford and Warren J. Fullen

It is certified that error appears in the above-identified patent and that said Letters Patent are hereby corrected as shown below:

Column 1, line 11, after "Ill. 60901" insert -- assignors to General Mills, Inc. --. Column 2, line 50, "their" should read -- there --; line 70, "qualities" should read -- quantities --. Column 5, line 18, the right-hand portion of the formula reading "$D(NCO)_2 + 2NaCl$" should read -- $D(NCO)_2 + 2N_2$ --. Column 6, line 9, "naththenic" should read -- naphthenic --; line 10, "napththenic" should read -- naphthenic --; line 21, delete entire line beginning "paring ... are the". Column 8, line 48, after "with" insert -- the --. Column 10, line 42, "mixture" should read -- mixtures --.

Signed and sealed this 3rd day of April 1973.

(SEAL)
Attest:

EDWARD M. FLETCHER, JR.
Attesting Officer

ROBERT GOTTSCHALK
Commissioner of Patents